(12) United States Patent
Guemmer

(10) Patent No.: US 10,316,677 B2
(45) Date of Patent: Jun. 11, 2019

(54) SHROUD ARRANGEMENT OF A ROW OF BLADES OF STATOR VANES OR ROTOR BLADES

(71) Applicant: Rolls-Royce Deutschland Ltd & Co KG, Blankenfelde-Mahlow (DE)

(72) Inventor: Volker Guemmer, Blankenfelde-Mahlow (DE)

(73) Assignee: ROLLS-ROYCE DEUTSCHLAND LTD & CO KIG, Blankenfelde-Mahlow (DE)

( * ) Notice: Subject to any disclaimer, the term of this patent is extended or adjusted under 35 U.S.C. 154(b) by 533 days.

(21) Appl. No.: 15/094,187

(22) Filed: Apr. 8, 2016

(65) Prior Publication Data
US 2016/0298477 A1    Oct. 13, 2016

(30) Foreign Application Priority Data
Apr. 9, 2015 (DE) .......... 10 2015 206 384

(51) Int. Cl.
*F01D 11/00* (2006.01)
*F01D 5/14* (2006.01)
(Continued)

(52) U.S. Cl.
CPC ............ *F01D 11/006* (2013.01); *F01D 5/021* (2013.01); *F01D 5/143* (2013.01); *F01D 5/225* (2013.01);
(Continued)

(58) Field of Classification Search
CPC ........ F01D 11/006; F01D 5/021; F01D 5/143; F01D 5/225; F01D 9/041; F01D 11/001;
(Continued)

(56) References Cited

U.S. PATENT DOCUMENTS 3,990,807 A * 11/1976 Sifford .................... F01D 11/08
                                                                        415/136
5,156,525 A * 10/1992 Ciokajlo ................. F01D 5/326
                                                                        415/190
(Continued)

FOREIGN PATENT DOCUMENTS

DE      102007027427 A1    12/2008
EP          2369138 A1     9/2011
WO      WO2014010052 A1    1/2014

OTHER PUBLICATIONS

German Search Report dated Oct. 26, 2015 from counterpart German App No. 10 2015 206 384.4.
(Continued)

*Primary Examiner* — Aaron R Eastman
(74) *Attorney, Agent, or Firm* — Shuttleworth & Ingersoll, PLC; Timothy J. Klima

(57) ABSTRACT

A cover band assembly of a blade row of stator or rotor blades is provided. The cover band assembly comprises a blade row that is arranged inside a main flow path of a continuous-flow machine and has multiple blades which respectively have a front edge and a rear edge; and a cover band of the blade row that is at least partially embedded in a component or a component group as regarded in a longitudinal section of the continuous-flow machine, wherein a cavity is formed that surrounds the cover band and is connected to the main flow path by way of two cavity openings, wherein the front cavity opening is provided upstream of the front edge and the rear cavity opening is provided downstream of the rear edge of the blades of the blade row. Here, the cover band has a leading edge and a trailing edge.

14 Claims, 13 Drawing Sheets

(51) Int. Cl.
*F01D 5/22* (2006.01)
*F01D 11/08* (2006.01)
*F01D 5/02* (2006.01)
*F01D 9/04* (2006.01)

(52) U.S. Cl.
CPC ............ *F01D 9/041* (2013.01); *F01D 11/001* (2013.01); *F01D 11/08* (2013.01); *F05D 2220/323* (2013.01); *F05D 2240/80* (2013.01); *F05D 2250/611* (2013.01); *F05D 2250/71* (2013.01); *F05D 2250/713* (2013.01); *Y02T 50/673* (2013.01)

(58) Field of Classification Search
CPC ............... F01D 11/08; F05D 2220/323; F05D 2240/80; F05D 2250/611; F05D 2250/71; F05D 2250/713
USPC ...................................................... 415/173.5

See application file for complete search history.

(56) References Cited

U.S. PATENT DOCUMENTS

| | | | | |
|---|---|---|---|---|
| 5,791,873 | A | * | 8/1998 | Kreitmeier ............. F01D 5/143 415/198.1 |
| 2008/0118350 | A1 | * | 5/2008 | Feeny ..................... F01D 11/08 415/173.1 |
| 2008/0310961 | A1 | | 12/2008 | Guemmer |
| 2009/0110550 | A1 | * | 4/2009 | Tani ......................... F01D 1/02 415/199.2 |
| 2011/0293402 | A1 | * | 12/2011 | Kreiselmaier .......... F01D 5/225 415/116 |
| 2012/0121394 | A1 | * | 5/2012 | Iida ......................... F01D 5/143 415/173.1 |
| 2014/0020392 | A1 | | 1/2014 | Hase et al. |
| 2014/0119901 | A1 | * | 5/2014 | Shibata ................... F01D 11/08 415/173.1 |
| 2015/0260042 | A1 | | 9/2015 | Nishijima et al. |

OTHER PUBLICATIONS

European Search Report dated Aug. 9, 2016 for counterpart European Application No. 16162874.8.

* cited by examiner

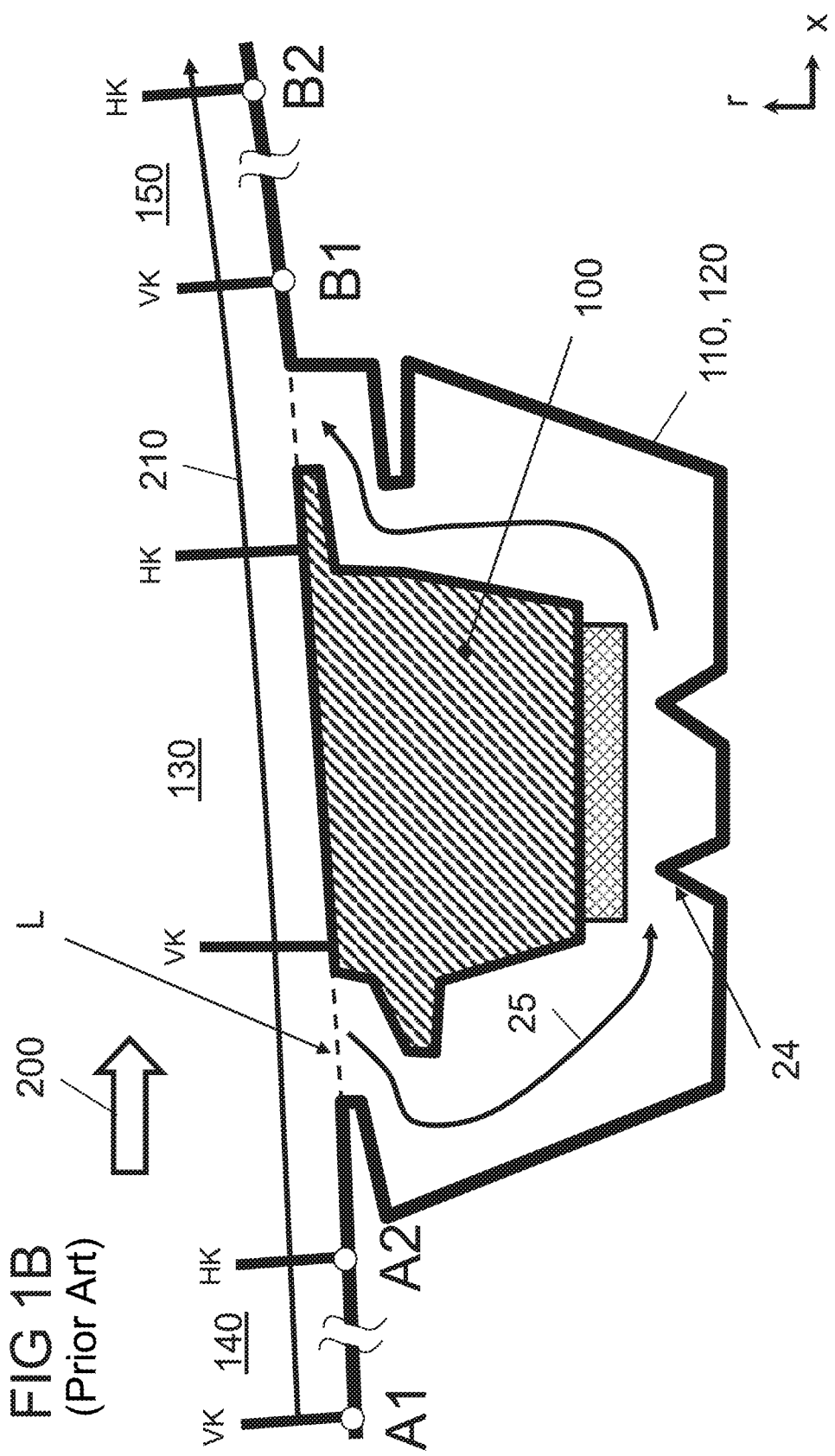

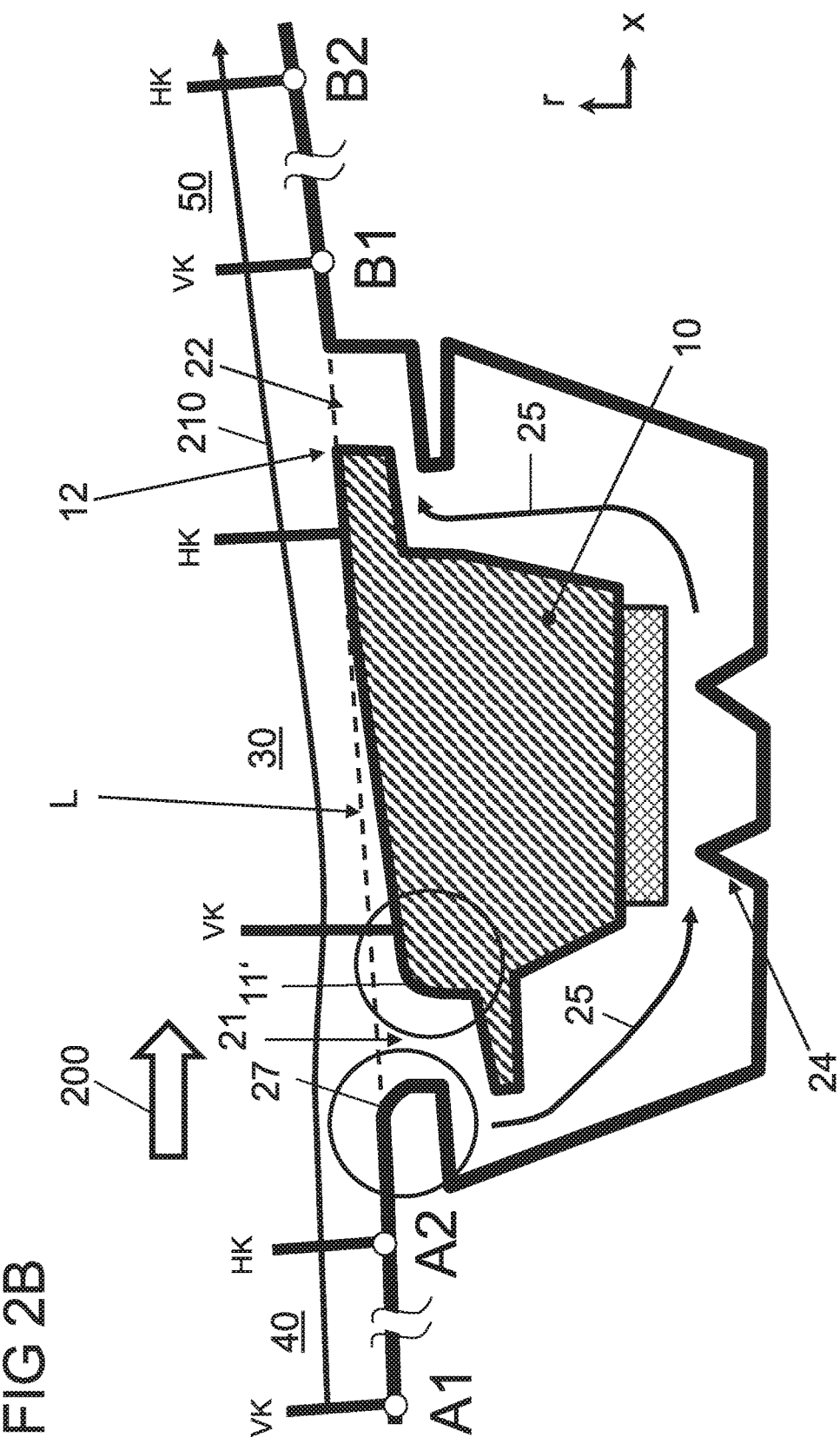

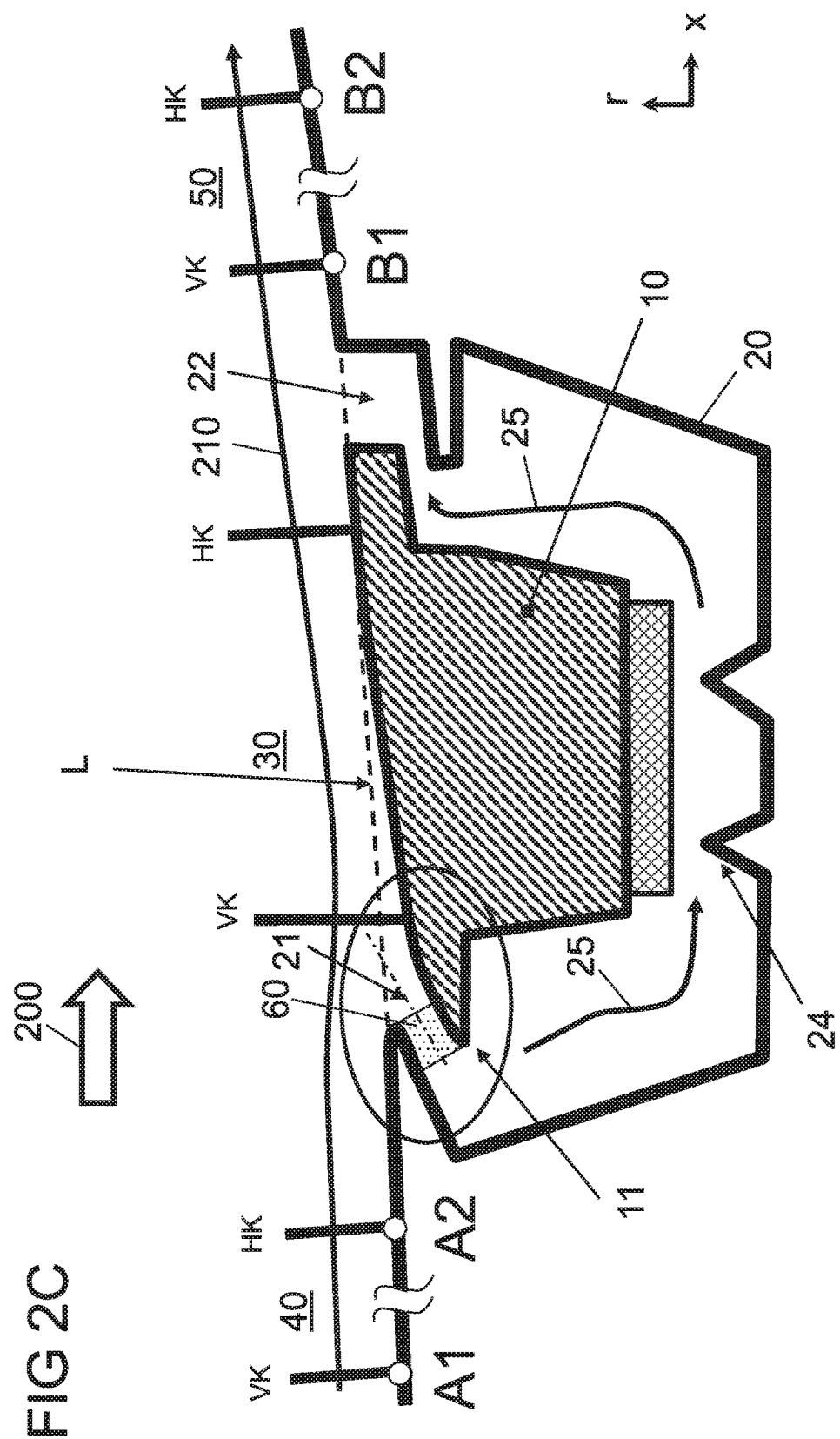

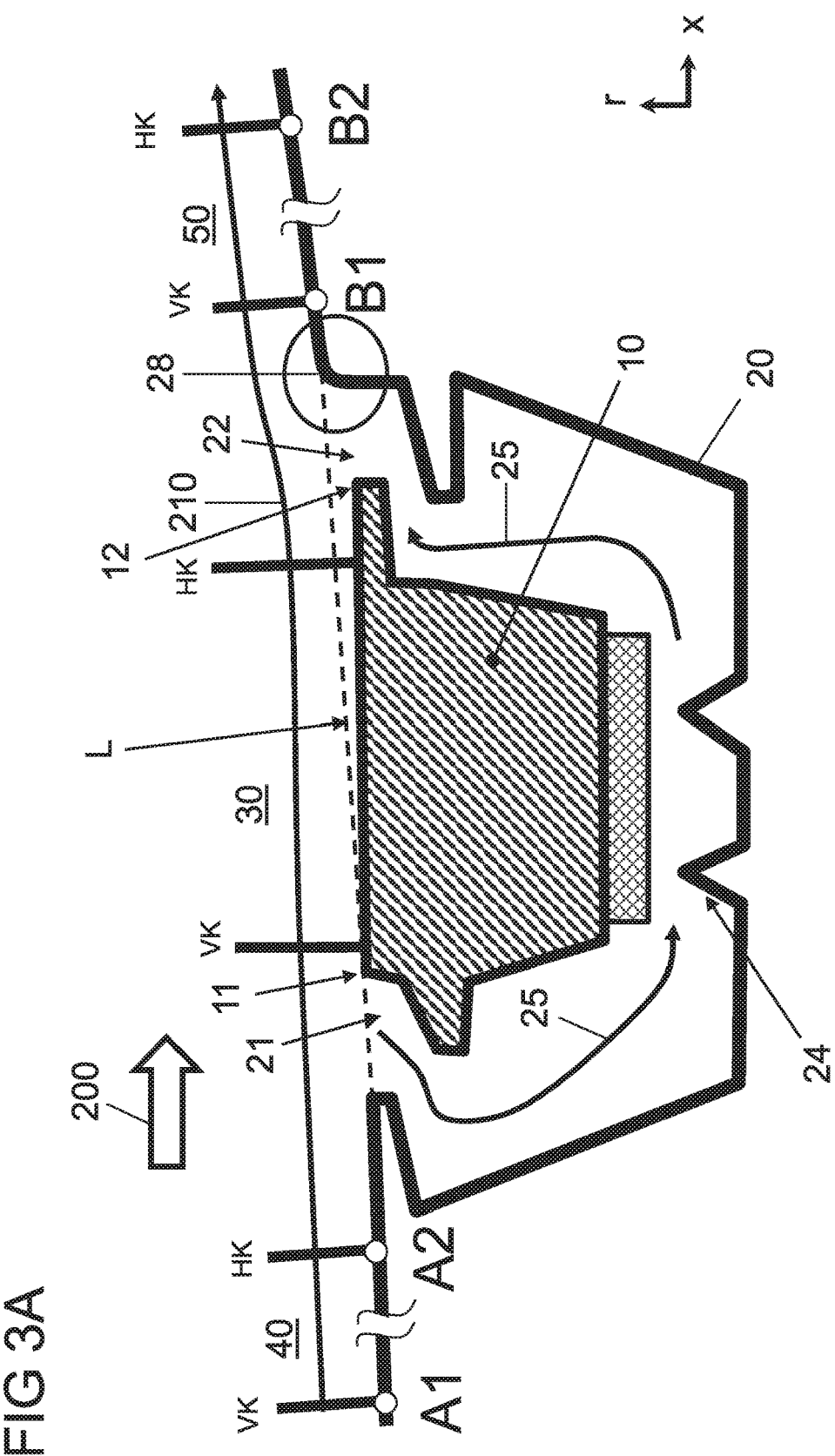

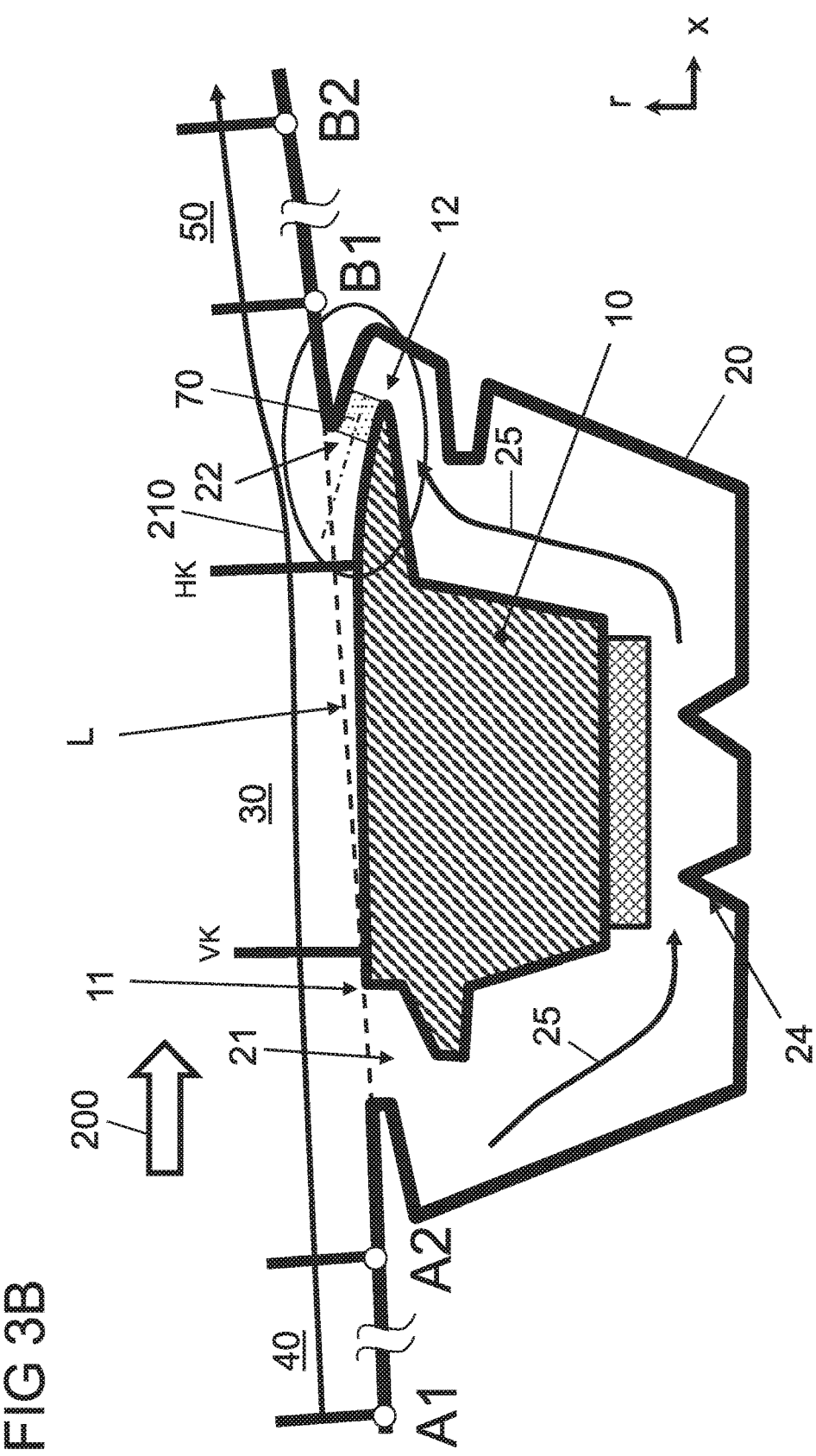

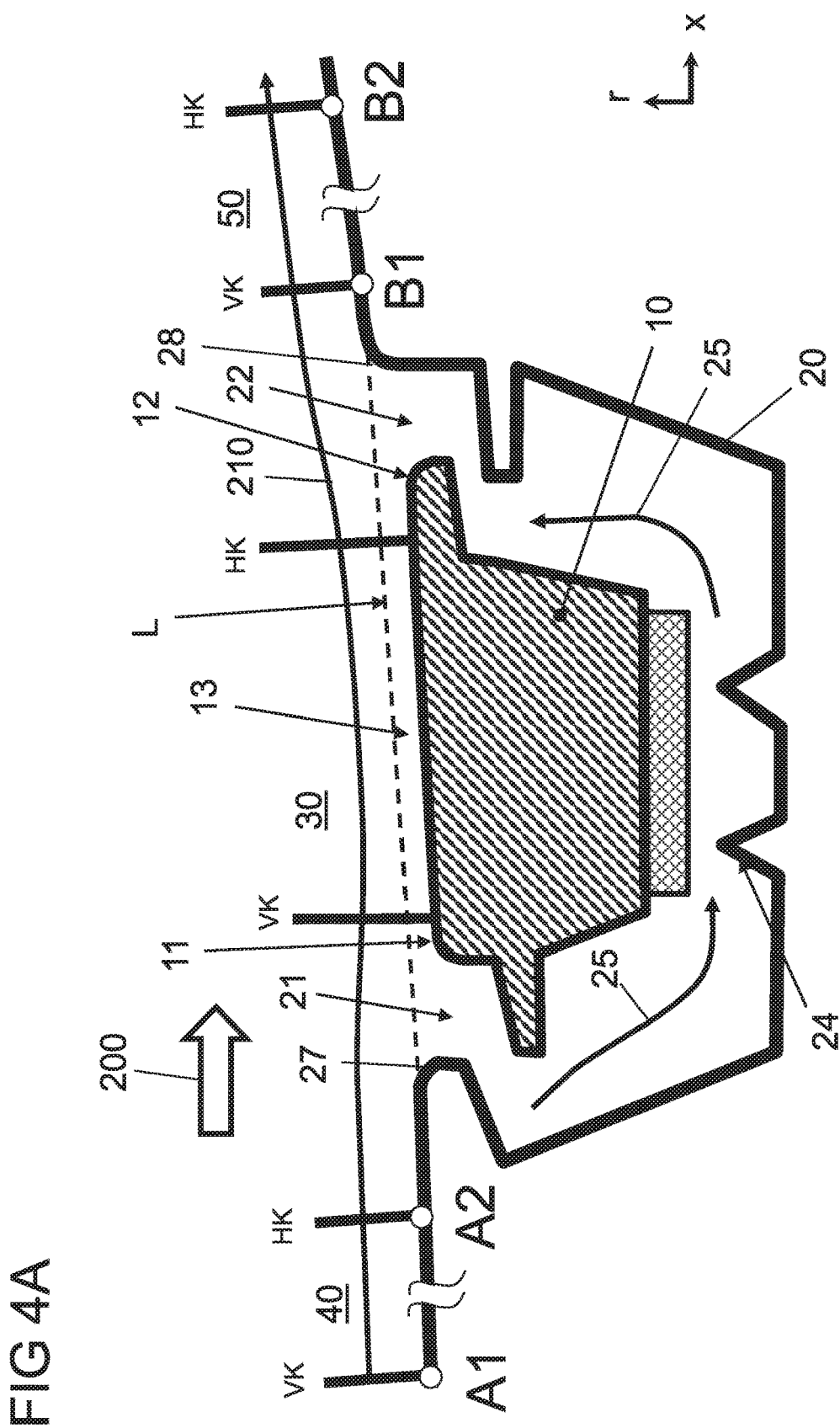

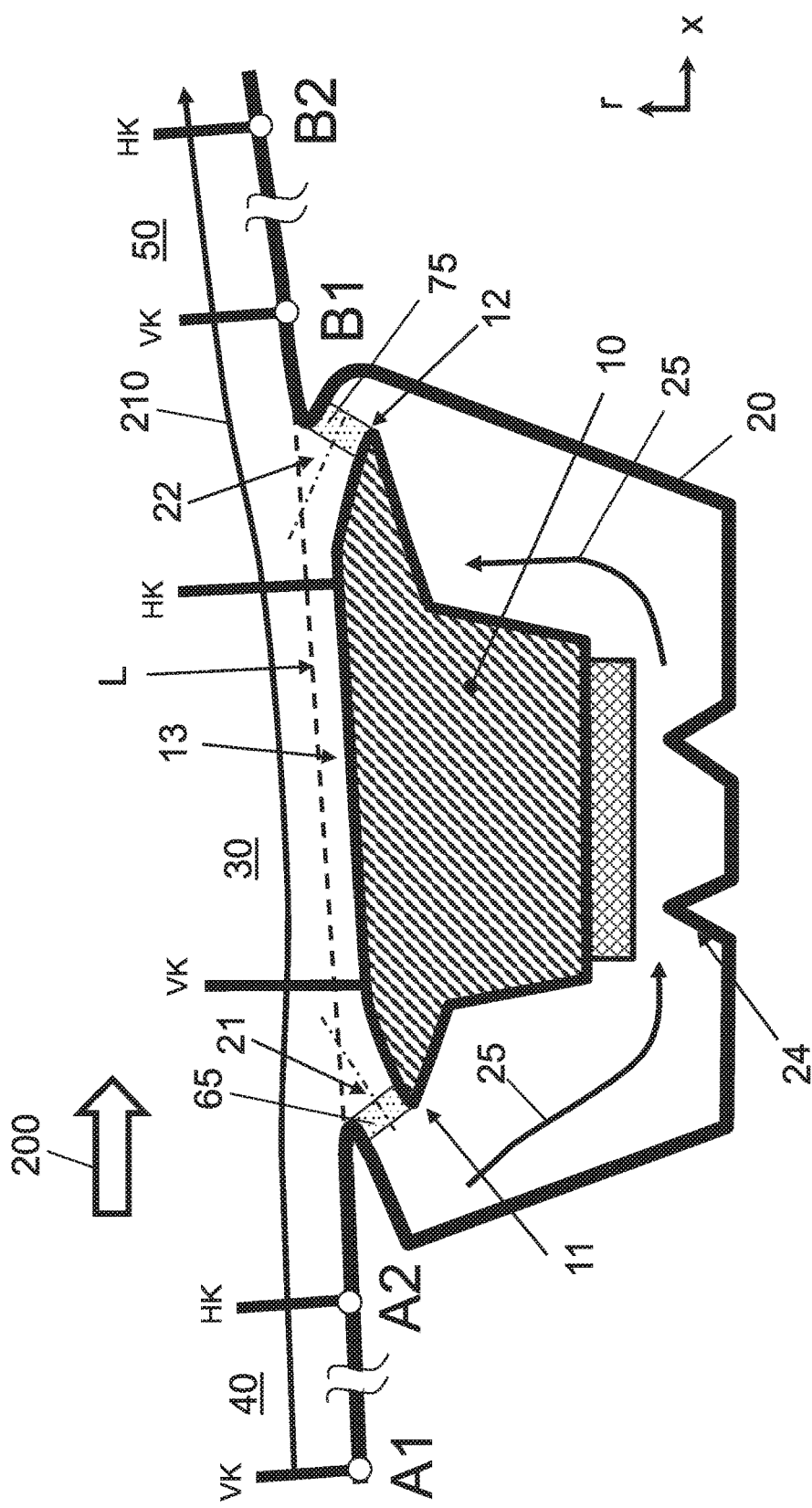

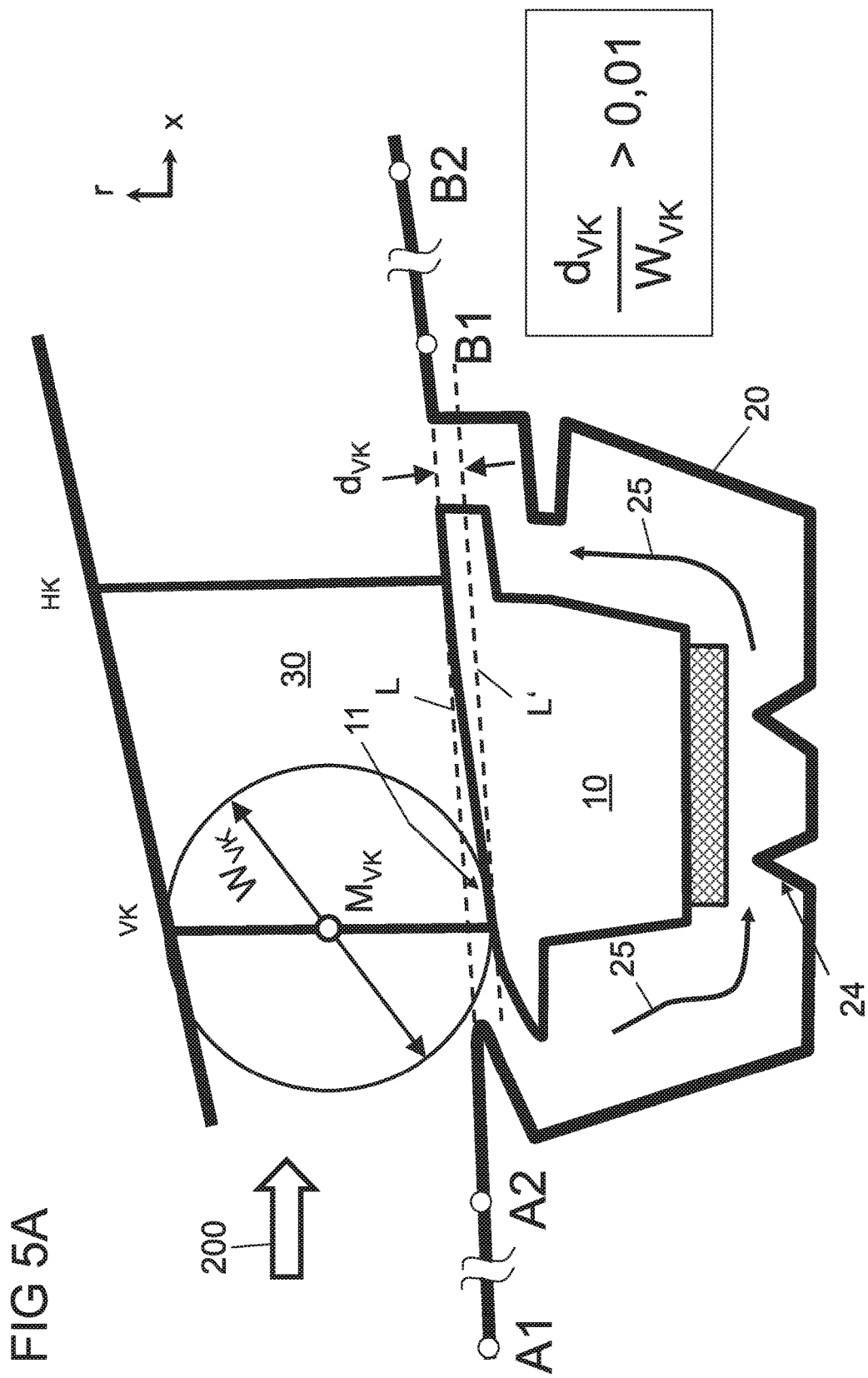

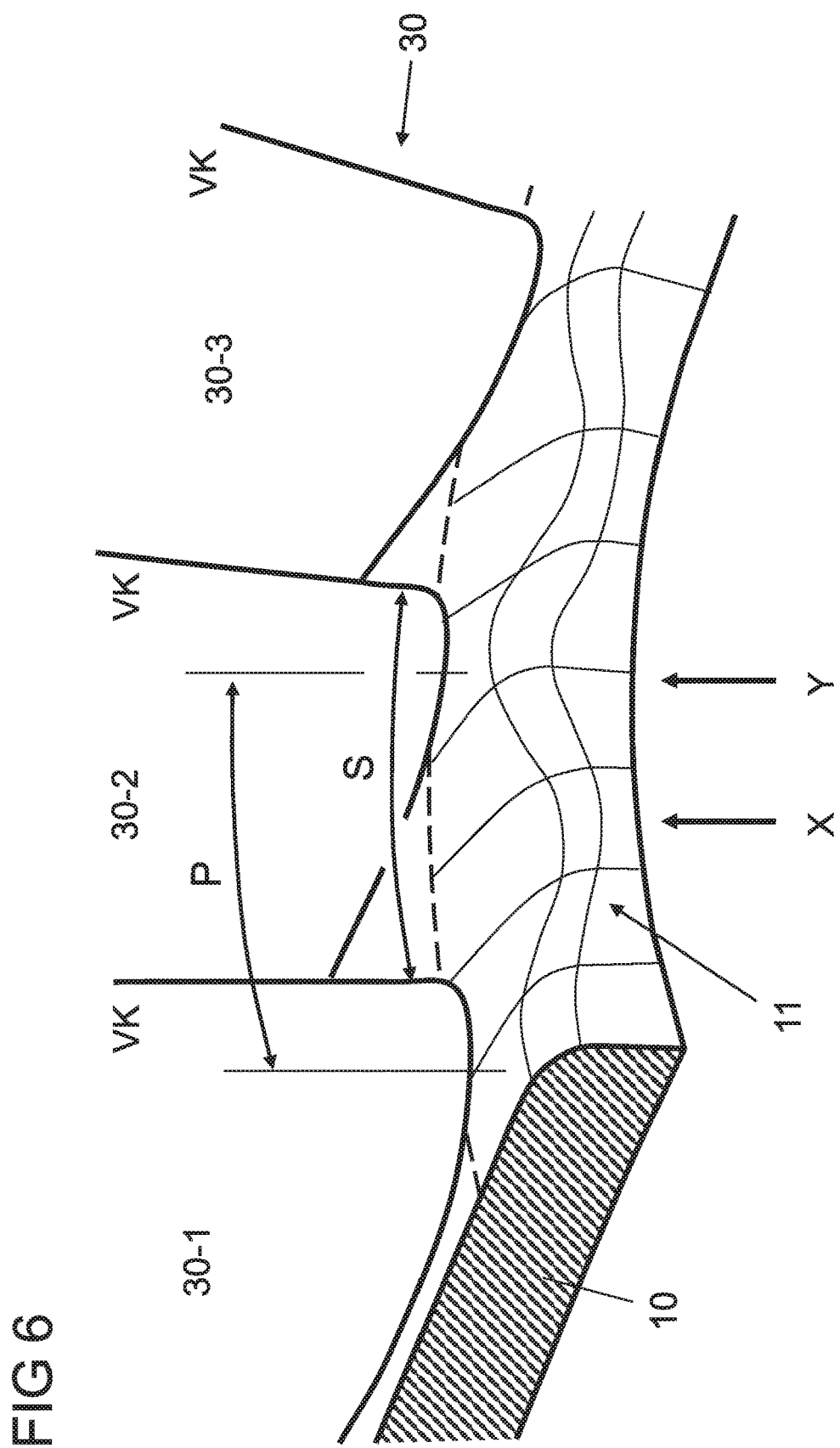

SHROUD ARRANGEMENT OF A ROW OF BLADES OF STATOR VANES OR ROTOR BLADES

REFERENCE TO RELATED APPLICATION

This application claims priority to German Patent Application No. 10 2015 206 384.4 filed on Apr. 9, 2015, the entirety of which is incorporated by reference herein.

BACKGROUND

The invention relates to a cover band assembly of a blade row of stator or rotor blades.

The aerodynamic resilience and efficiency of turbines is limited by the growth and detachment of boundary layers on the blades as well as on the hub and housing walls. In the state of the art, solutions for this fundamental problem could be provided only to a limited extent. One source for the losses which occur in turbines is the leakage flow about the blade cover bands, such as can often be found at the inner blade end of stators or at the outer blade end of rotors. Usually the leakage flow is kept small through sealing tips or other sealing means that are arranged inside the cavity in which the cover band is embedded. Still the leakage flow can have extremely detrimental effects on the performance of the turbine, in particular in highly loaded blade rows that are characterized by a high static pressure drop and thus a strong propulsion of the leakage flow.

In cover band assemblies according to the state of the art, the leakage flow is substantially determined by the gap that is left by the sealing means between stationary and rotating components. The sealing gap is usually formed between sealing tips and a contour that is arranged opposite the sealing tips. Here, the leakage flow strongly increases with the aerodynamic load and the sealing gap width that is chosen for the blade row to which the cover band is applied. This results in poor characteristic operating values with respect to the level of efficiency and the width of the turbine's operating range.

SUMMARY

The present invention is based on the objective to provide a cover band assembly of a blade row of stator or rotor blades that effectively reduces leakage flow around the cover band.

According to the invention, this objective is solved by a cover band assembly with the features as described herein.

According to this, it is provided in the present invention that, in at least one longitudinal section, the cover band contour is retracted away from the main flow path into the cavity in the area of its leading edge and/or in the area of its trailing edge. In this manner, it is achieved that the streamlines close to the wall are curved and that a local modification of the pressure field is effected close to the cavity openings at the main flow path boundary. In particular, due to a local retraction of the cover band in the area of the leading edge and/or of the trailing edge (or in the area of the front edge and/or the rear edge of the blade row to which the cover band is applied), the course of the flow at the edge of the main flow path is additionally influenced and thus the pressure gradient which is acting at the cavity and which determines the cover band-leakage flow is reduced.

The solution according to the invention is based on the idea to influence the static pressure at the leading edge and/or at the trailing edge of the cover band by means of a special shape of the cover band in the area of the leading edge and/or in the area of the trailing edge, namely in such a manner that the static pressure gradient between the openings of the cavity is reduced at the main flow path, and thus the undesired leakage flow is reduced or ideally stopped altogether.

In particular, the present invention comprises designing a cover band of a blade row, in particular of a turbine, in such a manner that the contour of the cover band is arranged so as to be retracted from the main flow path in at least one position of the circumference and in at least one of the areas of the front or the rear edge of the blade row that comprises the cover band, namely in such a way that as a result a smooth overall course of the main flow path boundary is no longer present and a recess is thus formed with the section of the main flow path boundary that is provided directly upstream of the cover band, and a protrusion is formed with the section of the main flow path boundary that is provided directly downstream of the cover band, as regarded in the flow direction.

Here, it is advantageous if the cover band contour is arranged so as to be retracted from the main flow path in at least one of the areas of the front or rear edge with respect to a connection line, wherein the connection line is formed by means of a third-degree polynomial interpolation or a third-degree spline interpolation through four reference points, wherein the reference points are given by blade edge base points of the directly neighboring blade rows or by defined equivalence points at the main flow path boundary.

Here, it can be provided that in the area of at least one of the openings, by way of which the cover band cavity is connected to the main flow path, an effectively curved course of the main flow path contour and of the streamlines at the edge of the main flow path is present, corresponding to a contour recess that is present in the main flow direction in the area of the opening upstream of the front edge of the blade row and/or corresponding to a contour protrusion present in the main flow direction in the area of the opening downstream of the rear edge of the blade row.

A polynomial interpolation is an interpolation based on polynomials. An interpolation polynomial is a function that interpolates the neighboring reference points. What is regarded for the interpolation in the present case are third-degree polynomials that are structured as follows:

$$P(x)=a_0+a_1x+a_2x^2+a_3x^3$$

wherein $a_i$ are real numbers.

In a spline interpolation, the reference points are interpolated with the help of piecewise continuous polynomials (splines). Again, third-degree splines are regarded, i.e. the piecewise continuous polynomials forming the spline interpolation are third-degree polynomials.

In both cases (polynomial interpolation and spline interpolation) a smooth and harmonious deflection curve is provided through the reference points, wherein the deflection curve runs through all reference points with minimal bending energy and the smallest curvatures.

Accordingly, it is provided in one embodiment of the invention that the cover band, as regarded in the axial direction of the continuous-flow machine, is respectively arranged between at least two (imagined) reference points that are located at the edge of the main flow path of the continuous-flow machine. The first two reference points are constituted by base points of the front edge and the rear edge of the blade row arranged upstream of the cover band, or—if this blade row is not present—by two boundary points of the main flow path, which are for example located at 100% and 150% of the axial extension of the blade row to which the cover band is applied and upstream of the front edge of the blade row to which the cover band is applied. The two second reference points are constituted by base points of the front edge and rear edge of the blade row that is arranged downstream of the cover band, or—if this blade row is not present—by two boundary points of the main flow path, which are for example located at 100% and 150% of the axial extension of the blade row to which the cover band is applied and downstream of the rear edge of the blade row to which the cover band is applied. Here, the cover band is retracted in at least one location of the circumference and in at least one of the areas of the front or the rear edge of the respective blade row into the cavity to below a connection line, which is formed by means of a third-degree polynomial interpolation or a third-degree spline interpolation through these four reference points. Here, a curved course of the effective main flow path boundary and of the streamlines at the edge of the main flow path is achieved due to the cover band retraction in the area of at least one of two cavity openings.

For enhanced flow control, the leading edge of the cover band can be provided with a chamfer or a rounding. Further, for enhanced flow control it can be formed so as to be substantially nose-shaped. Likewise, the trailing edge of the cover band can be provided with a chamfer or a rounding for enhanced flow control. Further, the trailing edge of the cover band can be formed so as to be substantially nose-shaped for the purpose of enhanced flow control.

According to one embodiment of the invention, at the cavity opening upstream of the blade row comprising the cover band, the edge of the component which confines the cavity opening in the upstream direction is formed so as to be chamfered or rounded or substantially nose-shaped at the main flow path boundary. Likewise, at the cavity opening downstream of the blade row comprising the cover band, the edge of the component which confines the cavity opening in the downstream direction can be formed so as to be chamfered or rounded or substantially nose-shaped at the main flow path boundary.

It is provided in one embodiment of the invention that the contour of the cover band that is facing towards the main flow path is formed in such a manner in the area of its leading edge that a passage is formed adjacent to the main flow path upstream of the blade front edge between the cover band contour and the outer contour of the cavity, wherein the passage guides the entering leakage flow with a directional component against the main flow, and accordingly the longitudinal axis of the passage forms an acute angle (in the mathematically negative rotational direction, clockwise) between itself and the connection line.

It is provided in another embodiment of the invention that the contour of the cover band that is facing towards the main flow path is formed in such a manner in the area of its trailing edge that a passage is formed adjacent to the main flow path downstream of the blade rear edge between the cover band contour and the outer contour of the cavity, wherein the passage guides the exiting leakage flow with a directional component against the main flow, and accordingly the longitudinal axis of the passage forms an acute angle (in the mathematically positive rotational direction, counterclockwise) between itself and the connection line.

Also, the cover band retraction according to the invention can be provided in the area of the leading edge as well as in the area of the trailing edge. Here, the cover band retraction extends continuously between the leading edge and the trailing edge in one embodiment.

According to another embodiment, cover band retraction as well as the shape of the respective edge of the cover band vary periodically in the circumferential direction of the blade row to which the cover band belongs. Here, in one embodiment, the period P of the circumferentially directed variation of the cover band retraction and of the cover band edge shape has a whole-number ratio to the blade pitch S of the blade row to which the cover band is applied, namely according to n×P=S, wherein n is a natural number equal to or greater than 1. Thus, the period P of the circumferentially directed variation of the cover band retraction is equal to the blade pitch S, for example.

Here, it can be provided that, as regarded in the circumferential direction of the blade row, the maximum of the cover band retraction is formed respectively at half the distance between two neighboring blades of the blade row (also as regarded in the circumferential direction, centered between two neighboring blades).

For example, the extent of the cover band retraction can be selected as follows. If the cover band retraction d is defined as the distance between the mentioned connection line, which is generated through polynomial interpolation or a spline interpolation, and a curve through the location of maximal cover band retraction that extends at a constant distance to the same, then the cover band retraction d is at least 1%, i.e. $dVK/WVK>0.01$ and/or $dHK/WHK>0.01$ with regard to the ring channel width W at the blade edge (front edge VK or rear edge HK) closest to the location of maximal retraction. However, it applies as a restriction that the cover band retraction in the front edge area dVK is to be determined directly at the blade front edge, and the cover band retraction in the rear edge area dHK is to be determined directly at the blade rear edge, if the location of the maximal cover band retraction is located within the blade row between the front and the rear edge.

Here, the extent of the cover band retraction may be up to 8%, i.e. $dVK/WVK<0.08$ and/or $dHK/WHK<0.08$.

The invention also relates to a turbine, in particular of an aircraft engine, having a cover band assembly as described herein.

It should be noted that the cover band assembly according to the invention may have a blade row of stator or rotor blades that are fixed in place either in a twistable or in a non-twistable manner. Further it should be noted that the continuous-flow machine can be at least partially embedded in a component or a component group which is a rotating shaft or a stationary housing.

The present invention relates to blade rows of turbines of an axial or semi-axial design with a gaseous or liquid working medium. The turbine can comprise one or multiple stages with respectively one stator and one rotor, and in particular cases a stage is formed by just one rotor. The rotor is comprised of a number of blades which are connected to a rotating shaft of the machine and receive energy from the working medium. The rotor can be embodied with or without a cover band at the outer blade end. The stator is comprised of a number of stationary blades which can be embodied with a fixated or free blade end at the side of the hub as well as at the side of the housing. The rotor drum and the blading are usually surrounded by a housing.

The machine can also have a stator, a so-called inlet guide vane, in front of the first rotor. Divergent from the immobile mounting, at least one stator or inlet guide vane can be mounted in a rotatable manner in order to change the angle of attack. An adjustment is effected by a mandrel that is accessible from outside the ring channel, for example. Alternatively, if the mentioned turbine comprises several stages, it can have two contra-rotating shafts, so that the rotor blade rows change the rotational direction from stage to stage. Here, there are no stators between successive rotors.

The continuous-flow machine, in which a cover band assembly according to the invention is used, may for example be a jet engine, in particular a turbofan engine.

BRIEF DESCRIPTION OF THE DRAWINGS

In the following, the invention is described based on exemplary embodiments in connection with the figures.

FIG. 1b (Prior Art): shows a cover band assembly according to the state of the art, wherein certain reference points are defined at surrounding blade rows.

FIG. 2b: shows another exemplary embodiment of a cover band assembly, in which a cover band retraction is effected in the front edge area.

FIG. 2c: shows another exemplary embodiment of a cover band assembly, in which a cover band retraction is effected in the front edge area.

FIG. 3a: shows an exemplary embodiment of a cover band assembly, in which a cover band retraction is effected in the rear edge area.

FIG. 3b: shows another exemplary embodiment of a cover band assembly, in which a cover band retraction is effected in the rear edge area.

FIG. 4a: shows an exemplary embodiment of a cover band assembly, in which a cover band retraction is effected in the front edge area and in the rear edge area.

FIG. 4b: shows another exemplary embodiment of a cover band assembly, in which a cover band retraction is effected in the front edge area and in the rear edge area.

FIG. 5a: shows a blade row with a cover band assembly, also showing parameters by means of which the extent of a cover band retraction in the front edge area can be indicated.

FIG. 6: shows a periodical circumference variation of a cover band retraction in the front edge area in a perspective rendering.

DETAILED DESCRIPTION

Figure 1A:
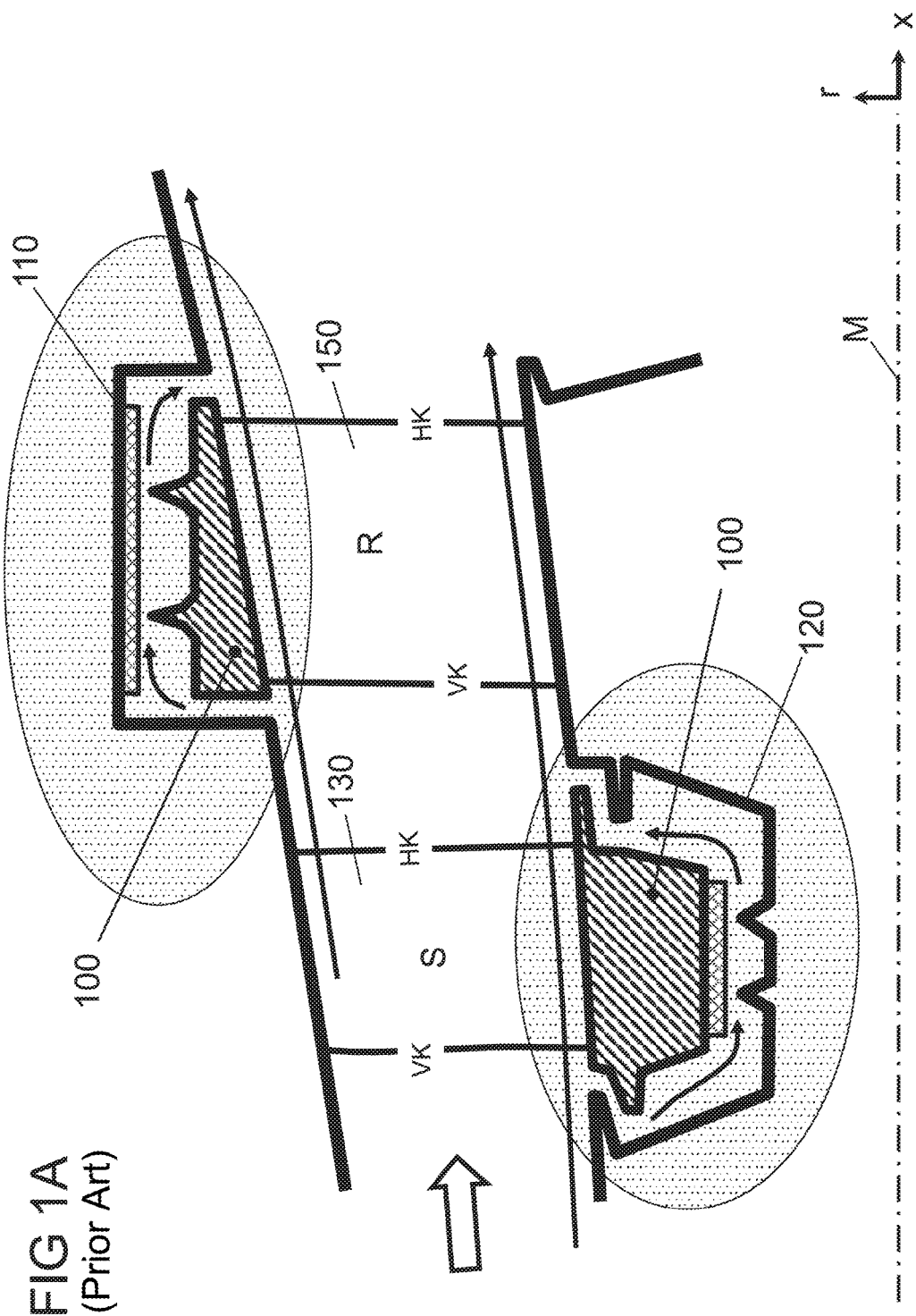
FIG. 1a (Prior Art): shows a turbine section according to the state of the art, comprising a rotor and a stator which respectively have one cover band assembly.
Figure 1C:
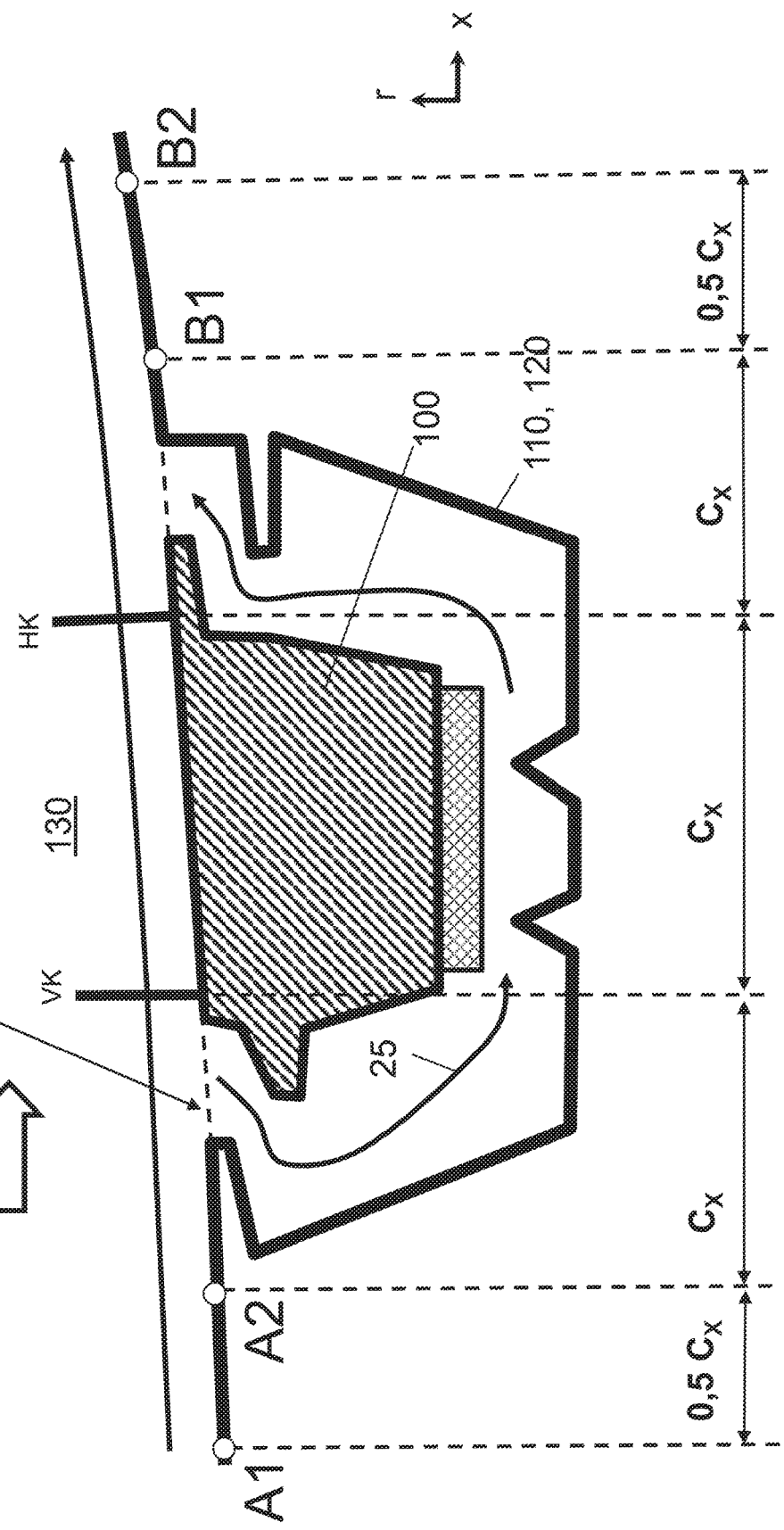
FIG. 1c (Prior Art): shows a cover band assembly according to the state of the art, wherein certain reference points are defined without surrounding blade rows.

At first, to provide a better understanding of the invention, the state of the art is explained by referring to FIGS. 1a to 1c.

FIG. 1a (Prior Art) schematically shows a sectional view of a portion of a turbine, comprising a blade row 130 of a stator S and a blade row 150 of a rotor R. One cover band assembly 100 is respectively provided at the outer blade end of the rotor R as well as of the stator S. According to the state of the art, the rotor cover band assembly comprises a large cavity that is provided in the non-rotating housing 110 and completely accommodates the cover band 100 so as to render an outer main flow path boundary as smooth as possible. Correspondingly, the stator cover band assembly comprises a large cavity which is provided in the rotating hub 120 and completely accommodates the cover band 100 so as to render an inner main flow path boundary as smooth as possible.

M indicates the machine axis of the turbine, x the axial direction, and r the radial direction.

FIG. 1b (Prior Art) shows, in a manner representative of cover bands of adjustable or stationary rotors and stators, an arrangement of three blade rows 130, 140, 150 at an edge of the main flow path of a turbine, consisting of a blade row 140 that is located upstream, of a blade row 130 with a cover band, and a blade row 150 that is located downstream. This rendering can represent a region at the stationary housing 110 as well as a region at the rotating hub 120 of the turbine. The main flow 200 in the main flow path is indicated by a thick arrow and runs from left to right. The leakage flow 25 that occurs within the cover band cavity also runs in the direction of the main flow, i.e. from the connection point of the cavity with the main flow path upstream of the blade row 130 to which the cover band is applied 100 to the connection point of the cavity with the main flow path downstream of the respective cover band 100, and following the pressure gradient that is present downstream in the main flow path.

As has been mentioned, the cover band 100 is embedded in a surrounding component or a surrounding component group (housing 110 or rotor hub 120) and according to the state of the art is smoothly integrated into the course of the main flow path. The cover band 100 can be designed as a solid or also (as not shown herein) as a hollow piece and consists of one or multiple components. The leakage flow 25 (small arrows) that is occurring between the cover band 100 and the surrounding component, and that may pass with the main flow direction 200, is reduced by sealing means, in most cases by a number of sealing tips 24. The sealing tips can be arranged at the surrounding component 110, 120 or also at the cover band itself (as not shown here, but in FIG. 1a). Usually, relative movement occurs between the surrounding component 110, 120 and the cover band 100.

In the area of the cover band 100, the front edge VK and the rear edge HK of the regarded blade row 130 are indicated. Upstream of the cover band 100, the front edge and the rear edge of the blade row 140 which is arranged upstream are indicated; the base point of this front edge is indicated by A1; the base point of this rear edge is indicated by A2. Downstream of the cover band 100, the front edge and the rear edge of the blade row 150 arranged downstream are indicated; the base point of this front edge is indicated by B1; the base point of this rear edge is indicated by B2. A thin long arrow 210 characterizes the flow that is located close to the edge along the substantially smooth boundary of the main flow path. According to the state of the art, the contour of the cover band 100 at the main flow path does not extend below a connection line L, which is generated through a third-degree polynomial or a third-degree spline that runs through the four reference points A1, A2, B1, B2. In other words, the contour of the cover band 100 is not retracted into the cavity.

A very minor deviation of the connection line L—albeit an insignificant one when measured against other dimensions of the cover band—can occur in the state of the art due to production tolerances or also at operating points of the turbine outside of the design conditions by thermal upset of the component. As outlined in FIG. 1b, the main flow enters the blade row comprising the cover band at the edge area of the main flow path without being influenced by a break or an unevenness in the contour layout of the main flow path boundary, and flows over and beyond the cover band 100 that is arranged in alignment with the rest of the contour.

In the case that there is no blade row upstream of the cover band 100, the position of point A1 is determined by a distance to the front edge of 150% of the axial length Cx at the edge of the blade row 130 to which the cover band is applied 100. The position of point A2 is determined by a distance to the front edge of 100% of the axial length Cx at the edge of the blade row to which the cover band is applied 100. This is shown in FIG. 1c (Prior Art).

In the case that there is no blade row downstream of the cover band 100, the position of point B1 is determined by a distance to the rear edge of 100% of the axial length Cx at the edge of the blade row 130 to which the cover band is applied 100, see FIG. 1c. The position of point B2 is determined by the distance to the rear edge of 150% of the axial length Cx at the edge of the blade row 130 to which the cover band is applied 100.

A conventional cover band configuration according to the state of the art, as it is shown in FIG. 1b, thus provides that the main flow enters the blade row comprising the cover band close to the main flow path boundary without any interference by a break or an unevenness in the contour layout. Here, the flow runs smoothly over the openings of the cover band cavity and the side of the cover band that is facing the main flow path and is arranged in alignment with the contour that is located upstream and downstream. In such an arrangement, the static pressures that are applied to the cavity openings and determine the leakage flow are strictly predetermined and show considerable differences. As indicated by the thin curved arrows, the leakage flow 25 enters the cavity upstream of the cover band leading edge and exits the cavity downstream of the cover band trailing edge.

The goal of the present solution according to the invention is to influence the static pressure at the leading edge and at the trailing edge of the cover band through the special shape of the cover band in the area of the blade's front and/or rear edge, namely in such a manner that the static pressure gradient between the openings of the cavity at the main flow path and thus the undesired leakage flow is reduced or ideally stopped altogether.

Cover band configurations according to the invention are shown in FIG. 2a to FIG. 4b. Relevant for the present invention is only the contour shape of the cover band close to the main flow path in the area around the front and the rear edge of the blade row. The shape of the cover band in the deep interior of the cavity, in which the cover band is embedded, is not the subject matter of the invention. Neither does the particular design of the components that are surrounding the cavity or the design of the sealing means constitute the subject matter of the invention. The mentioned features that are not relevant to the invention are outlined here in a simplified form only for the purpose of clarity and only to the extent that is necessary in order to explain and understand the relevant context of the invention.

Figure 2A:
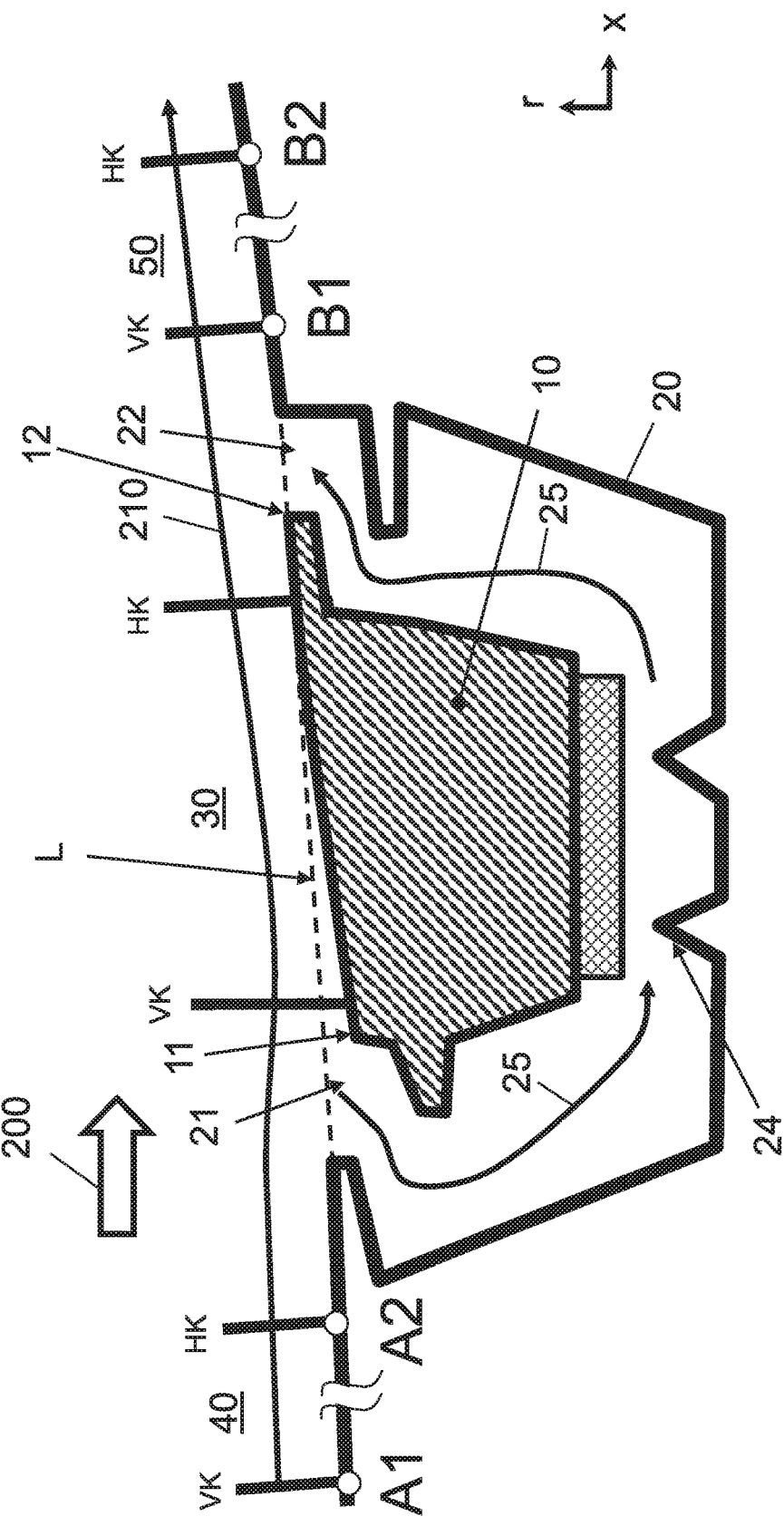
FIG. 2a: shows an exemplary embodiment of a cover band assembly, in which a cover band retraction is effected in the front edge area.

FIG. 2a to FIG. 2c show in an exemplary manner some cover band assemblies according to the invention, comprising a retraction in the area of the front edge of the respective blade row. A retraction according to the invention is characterized in that, in at least one freely selectable longitudinal section of the turbine, a part of the cover band contour is retracted below the connection line L, i.e. away from the main flow path into the cavity, and in this manner provides for a curvature of the streamlines that are close to the wall as well as for a local modification of the pressure field close to the cavity openings at the main flow path boundary. Here, the connection line L is a third-degree polynomial interpolation or a third-degree spline interpolation through the reference points A1, A2, B1, B2 which have been described in connection to FIG. 1b and FIG. 1c and which are also shown in FIG. 2a to FIG. 2c. These reference points are chosen here only by way of example. Principally, other reference points can also be chosen.

FIG. 2a shows, in a manner that is representative of cover bands of adjustable or fixedly attached rotors and stators, an arrangement of three blade rows 30, 40, 50 at an edge of the main flow path of a turbine, comprising a blade row 40 that is arranged upstream, a blade row 30 comprising the cover band 10 according to the invention, and a blade row 50 that is arranged downstream. The structure 20, which forms the cavity inside of which the cover band 10 is located, can for example be a rotating hub or a stationary housing. The main flow 200 in the main flow path is indicated by a thick arrow and flows from left to right. A thin long arrow 210 characterizes the flow close to the edge along a boundary of the main flow path. Further, the leakage flow 25 is formed within the cover band cavity. The cavity has a front cavity opening 21 towards the main flow path 200 upstream of the blade row 30 to which the cover band is applied 10 and a rear cavity opening 22 towards the main flow path 200 downstream of the blade row 30 to which the cover band is applied 10.

With respect to a fluid flowing in the main flow path, the cover band 10 comprises a leading edge 11 and a trailing edge 12. The leading edge 11 is located in the area of the front edge VK of the blade row 30 and the trailing edge 12 is located in the area of the rear edge HK of the blade row 30.

FIG. 2a shows an exemplary embodiment in which the cover band contour is most strongly retracted into the cavity in the area of the leading edge 11 of the cover band 10 and the front edge VK of the blade row 30 with respect to a connection line L, and in which the retraction decreases in the direction of the blade rear edge HK. It can be advantageous if the retraction becomes zero at the blade rear edge or at the cover band trailing edge.

As outlined in FIG. 2b, here the leading edge 11' of the cover band 10 can be provided with a rounding or can have a nose-shaped form for the purpose of enhancing flow control. Due to the retracted cover band, a recess is created in the area of the opening 21 of the cavity at the main flow path that is provided upstream of the blade row 30, with the flow conforming to that recess. Here, it can be advantageous if, upstream of the cover band 10 at the main flow path, the edge 27 of the component that confines the cavity opening 21 in the upstream direction is formed so as to be chamfered or rounded.

FIG. 2c shows a solution according to the invention, in which the contour of the cover band 10 that is facing towards the main flow is formed in such a manner in the area of its leading edge 11 that a (possibly also curved) passage 60 is formed adjacent to the main flow path upstream of the blade front edge VK between the cover band contour and the outer contour of the cavity, see the shaded area in FIG. 2c. It is advantageous if the passage 60 guides the entering leakage flow with a directional component against the main flow and if for this purpose the longitudinal axis of the passage 60 forms an acute angle between itself and the connection line L (in the mathematically negative rotational direction, clockwise).

FIG. 3a and FIG. 3b show cover band configurations according to the invention in an exemplary manner, comprising a retraction of the cover band contour in the area of the trailing edge of the cover band or of the rear edge of the respective blade row. With respect to the basic structure, it is referred here to the explanations regarding FIG. 2a to FIG. 2c.

In FIG. 3a and FIG. 3b, the retraction according to the invention provides that, in at least one freely selectable longitudinal section of the turbine, a part of the cover band contour remains below the connection line L and in this manner provides for a curvature of the streamlines that are close to the wall and for a local modification of the pressure field. Due to the retracted cover band, a protrusion is created in the area of the opening 22 of the cavity at the main flow path that is provided downstream of the blade row 30, wherein the edge 28 of the component which confines the cavity in the downstream direction protrudes into the flow and exerts a damming effect on the flow downstream of the cover band 10 at the main flow path. It is advantageous if the edge 28 of the component that confines the cavity in the downstream direction is formed so as to be chamfered or rounded.

FIG. 3a shows an embodiment variant in which the trailing edge 12 of the cover band is embodied so as to be substantially angular. Here, it is advantageous if the edge 28 of the cavity opening 22 that is provided downstream of the cover band trailing edge is designed in a rounded manner.

It can also be provided that the trailing edge 12 of the cover band 10 is formed so as to be chamfered or rounded, as shown in FIG. 3b. Further, it can be advantageous if the trailing edge 12 of the cover band 10 is formed so as to be nose-shaped and protruding.

Here, FIG. 3b shows an embodiment variant in which the contour of the cover band 10 that is facing towards the main flow path is formed in such a manner in the area of its trailing edge 12 that a (possibly also curved) passage 70 is formed adjacent to the main flow path downstream of the blade rear edge HK between the cover band contour and the outer contour of the cavity, see shaded area in FIG. 3b. It is advantageous if the passage 70 guides the exiting leakage flow with a directional component against the main flow, and if the longitudinal axis of the passage 70 forms an acute angle (in the mathematically positive rotational direction, counterclockwise) between itself and the connection line L.

FIG. 4a, FIG. 4b and FIG. 4c show cover band configurations according to the invention in an exemplary manner, comprising a retraction of the cover band contour in the area of the leading edge 11 of the cover band 10 or of the front edge VK of the respective blade row 30 as well as in the area of the trailing edge 12 of the cover band 10 or of the rear edge HK of the respective blade row 30. A retraction according to the invention is characterized in that, in at least one freely selectable longitudinal section of the turbine, the cover band contour remains below the connection line L (which as before is defined as a polynomial or spline through the reference points A1, A2, B1, B2) and in this manner provides for a curvature of the streamlines that are close to the wall as well as for a local modification of the pressure field at both openings 21, 22 of the cavity at the main flow path (upstream and downstream of the blade row 30 comprising the cover band 10).

Due to the retracted cover band 10, a recess is created in the area of the opening 21 of the cavity at the main flow path that is provided upstream of the blade row 30, with the main flow conforming to that recess. Here, it can be advantageous if the edge 27 of the component that confines the cavity opening in the upstream direction is formed so as to be chamfered or rounded at the main flow path, see FIG. 4a.

Further, it is advantageous if the leading edge 11 of the cover band 10 is formed so as to be chamfered, rounded or nose-shaped.

Due to the retracted cover band 10, a protrusion is created in the area of the opening 22 of the cavity at the main flow path that is provided downstream of the blade row 30, wherein the edge 28 of the component that confines the cavity in the downstream direction protrudes into the flow and exerts a damming effect on the flow at the main flow path. It is advantageous if the edge 28 of the component that confines the cavity opening in the downstream direction is formed so as to be chamfered or rounded, see FIG. 4a. Further, it is advantageous if the trailing edge 22 of the cover band is formed so as to be chamfered, rounded or nose-shaped, see FIG. 4a or FIG. 4b.

Thanks to the retraction of the cover band contour in the area of the leading edge 11 of the cover band 10 as well as in the area of the trailing edge 12 of the cover band 10, a continuous area 13 is created between the leading edge 11 and the trailing edge 12 of the cover band 10, in which a retraction is present with respect to the connection line L. As shown in FIG. 4a, the retraction can be substantially constant in the axial direction. Alternatively, the value of the retraction can also vary in the axial direction.

FIG. 4b shows an exemplary embodiment in which the contour of the cover band 10 that is facing towards the main flow path is formed in such a manner in the area of its trailing edge 11 that a passage 75 is formed adjacent to the main flow path downstream of the blade rear edge HK between the cover band contour and the outer contour of the cavity, wherein it can be advantageous if the passage 75 guides the exiting leakage flow with a directional component against the main flow, and if the longitudinal axis of the passage 75 forms an acute angle (in the mathematically positive rotational direction, counterclockwise) between itself and the connection line L.

Further, it can be advantageous if the contour of the cover band 10 that is facing towards the main flow path is formed in such a manner in the area of its leading edge 11 that a passage 65 is formed adjacent to the main flow path upstream of the blade front edge VK between the cover band contour and the outer contour of the cavity, wherein it can be advantageous if the passage 65 guides the entering leakage flow with a directional component against the main flow, and if the longitudinal axis of the passage 65 forms an acute angle (in the mathematically positive rotational direction, counterclockwise) between itself and the connection line L.

Figure 5B:
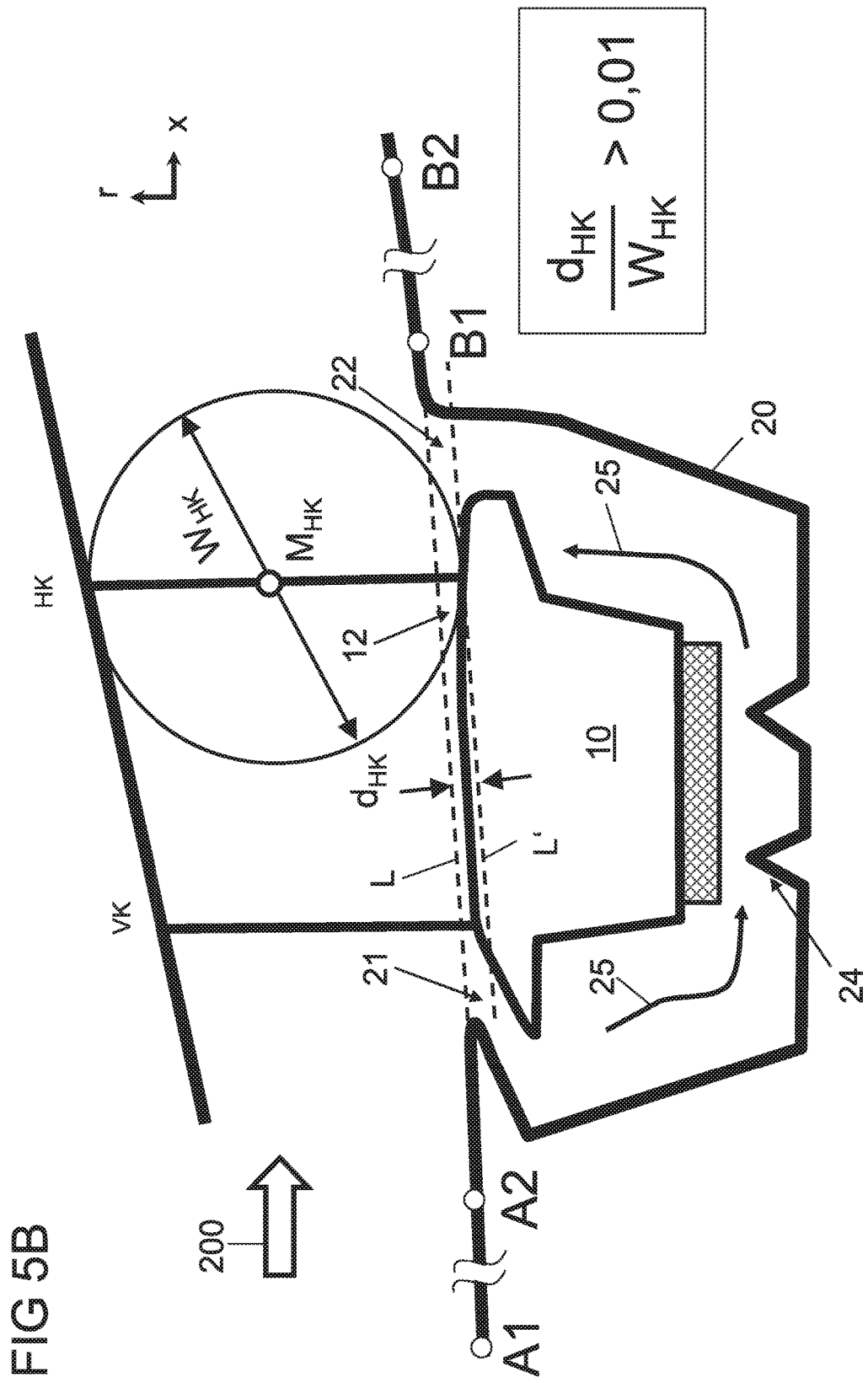
FIG. 5b: shows a blade row with a cover band assembly, also showing parameters by means of which the extent of a cover band retraction in the rear edge area can be indicated.

In FIG. 5a and FIG. 5b, variables for the quantification of the cover band retraction are defined. FIG. 5a shows a configuration with a cover band retraction in the front edge area. A line L', running through the position of maximal cover band retraction and extending at a constant distance to the connection line L, defines the extent of the cover band retraction. According to the invention, the extent of maximal retraction $d_{VK}$ is determined relative to the ring channel width $W_{VK}$ at the front edge VK. The ring channel width WVK is determined as the diameter of a circle that is inscribed into the ring channel (main flow path), with the central point $M_{VK}$ on the front edge VK. According to the invention, the following applies:

$$dVK/WVK > 0.01.$$

Cover band retractions according to $dVK/WVK > 0.02$ can be particularly advantageous.

FIG. 5b shows a configuration comprising a cover band retraction in the rear edge area. A line L', running through the position of maximal cover band retraction and extending at a constant distance to the connection line L, defines the extent of the cover band retraction. According to the invention, the extent of the maximal retraction $d_{HK}$ is determined relative to the ring channel width $W_{HK}$ at the rear edge HK. The ring channel width $W_{HK}$ is determined as the diameter that is inscribed into the ring channel (main flow path), with the central point $M_{HK}$ on the rear edge HK. According to the invention, the following applies:

$$dHK/WHK > 0.01.$$

Cover band retractions according to dHK/WHK>0.02 can be particularly advantageous.

If the maximal determined retraction is located within the blade row between the front and the rear edge, the cover band retraction in the front edge area $d_{VK}$ is determined directly at the front edge VK and the cover band retraction in the rear edge area $d_{HK}$ is determined directly at the rear edge HK.

FIG. 6 shows the front edge area of a blade row 30 comprising the cover band 10 in a spatial view over a part of the circumference. Of the blade row 30, three blades 30-1, 30-2, 30-3 are shown. Here, the cover band retraction is designed in such a manner that according to the invention the cover band retraction and the shape of the leading edge of the cover band vary periodically in the circumferential direction of the blade row to which the cover band belongs. Here, areas X of maximal retraction periodically alternate in the circumferential direction with areas Y of minimal retraction. In one embodiment it is provided that the areas X of maximal retraction are located so as to be straight between two blades 30-1, 30-2, 30-3, with respect to the circumferential direction.

Here, it can be provided that a whole period or also a multiple of the period of said retraction variation substantially corresponds to a blade pitch S of the respective blade row: n×P=S. Although the rendering in FIG. 6 shows the concept according to the invention by using the example of the leading edge 11 or of the front edge region of a blade row 30 comprising the cover band 10, according to the invention what is described herein also applies to a cover band retraction in the rear edge area.

As for its design, the invention is not limited to the exemplary embodiments described above, which are to be understood merely as examples. For instance, the principles of the invention can also be used in cover band assemblies that are not formed in a turbine.

Further, it should be understood that the features of the individual described exemplary embodiments of the invention can be combined with each other in different combinations. As far as areas are defined, they include all values within these areas as well as all partial areas that fall within an area.

The invention claimed is:

1. A cover band assembly of a blade row of stator or rotor blades, comprising:
   a blade row arranged inside a main flow path of a continuous-flow machine and having multiple blades which respectively have a front edge and a rear edge,
   a cover band of the blade row that is at least partially embedded in a component or a component group as regarded in a longitudinal section of the continuous-flow machine, wherein a cavity is formed that surrounds the cover band and is connected to the main flow path by front and rear cavity openings, wherein the front cavity opening is provided upstream of the front edge and the rear cavity opening is provided downstream of the rear edge of the blades of the blade row such that a leakage flow entering the front cavity opening flows through the cavity and exits the rear cavity opening, there being an imaginary connection line between the front cavity opening and the rear cavity opening at the main flow path,
   wherein the cover band has a leading edge and a trailing edge, and
   wherein a contour the cover band is retracted away from the main flow path into the cavity in an area of at least one chosen from the leading edge and the trailing edge in at least one longitudinal section of the continuous-flow machine;
   wherein the contour of the cover band which is facing towards the main flow path is formed in such a manner in an area of the leading edge that a front passage is formed adjacent to the main flow path upstream of the blade front edge between the contour of the cover band and an outer contour of the cavity, wherein the front passage guides the leakage flow entering the front cavity opening with an upstream directional component against the main flow, and accordingly a longitudinal axis of the front passage forms an acute angle in an upstream direction between the longitudinal axis of the front passage and the connection line;
   wherein the contour of the cover band which is facing towards the main flow path is formed in such a manner in an area of the trailing edge that a rear passage is formed adjacent to the main flow path downstream of the blade rear edge between the contour of the cover band and the outer contour of the cavity, wherein the rear passage guides the leakage flow exiting the rear cavity opening with an upstream directional component against the main flow, and accordingly a longitudinal axis of the rear passage forms an acute angle in a downstream direction and in a direction toward the cavity between the longitudinal axis of the rear passage and the connection line.

2. The cover band assembly according to claim 1, wherein:
   the cover band is arranged, as regarded in the axial direction of the continuous-flow machine, respectively between at least first and second sets of reference points that are located at an edge of the main flow path of the continuous-flow machine;
   the first set of reference points are formed by base points of the front edge and the rear edge of a blade row that is arranged upstream of the cover band, or—if this blade row is not present—by two boundary points of the main flow path, which are located at 100% and 150% of the axial extension of the blade row to which the cover band is applied upstream of the front edge of the blade row to which the cover band is applied,
   the second set of reference points are formed by the base points of the front edge and the rear edge of the blade row that is arranged downstream of the cover band, or—if this blade row is not present—by two boundary points of the main flow path, which are located at 100% and 150% of the axial extension of the blade row to which the cover band is applied downstream of the rear edge of the blade row to which the cover band is applied, and
   the cover band is retracted into the cavity in at least one location of the circumference and in at least one of the areas of the front or rear edge of the respective blade row to below the connection line, which is formed by a third-degree polynomial interpolation or a third-degree spline interpolation through the first set and second set off reference points.

3. The cover band assembly according to claim 2, wherein a cover band retraction that is defined as a distance between the connection line and a curve through a location of maximal cover band retraction that is extending at a constant distance to the connection line, and, is at least 1% of a ring channel width at the blade edge that is closest to the location of maximal cover band retraction, wherein the cover band retraction in the front edge area is determined directly at the blade front edge and the cover band retraction in the rear edge area is determined directly at the blade rear edge if the location of maximal cover band retraction is located within the blade row between the front and the rear edge.

4. The cover band assembly according to claim 1, wherein the leading edge of the cover band includes a chamfer or a rounding for enhanced flow control.

5. The cover band assembly according to claim 1, wherein the leading edge of the cover band has a protruding profile for enhanced flow control.

6. The cover band assembly according to claim 1, wherein the trailing edge of the cover band includes a chamfer or a rounding for enhanced flow control.

7. The cover band assembly according to claim 1, wherein the trailing edge of the cover band has a protruding profile for enhanced flow control.

8. The cover band assembly according to claim 1, wherein, at the front cavity opening, an edge of a component that confines the front cavity opening in the upstream direction is formed so as to be chamfered or rounded or has a protruding profile at the main flow path boundary.

9. The cover band assembly according to claim 1, wherein, at the rear cavity opening, an edge of a component that confines the rear cavity opening in the downstream direction is chamfered or rounded or has a protruding profile at the main flow path boundary.

10. The cover band assembly according to claim 1, wherein a cover band retraction is provided in the area of the leading edge as well as in the area of the trailing edge.

11. The cover band assembly according to claim 1, wherein a cover band retraction, as well as a shape of a respective edge of the cover band vary periodically in a circumferential direction of the blade row, wherein a period P of a circumferentially directed variation of the cover band retraction and of a cover band edge shape has a whole-number ratio to a blade pitch S of the blade row, according to $n \times P = S$, wherein n is a natural number equal to or greater than 1.

12. The cover band assembly according to claim 11, wherein a maximum of the cover band retraction as regarded in the circumferential direction of the blade row is formed respectively at half a distance between two neighboring blades of the blade row.

13. The cover band assembly according to claim 1, wherein, at least in one longitudinal section of the continuous-flow machine, the contour of the cover band is retracted away from the main flow path into the cavity in at least one chosen from the area of the leading edge and in the area of the trailing edge such that at least one chosen from the following occurs: an overall smooth course of the main flow path boundary is no longer present and instead the retracted leading edge forms a recess with respect to a section of the main flow path boundary that is provided directly upstream of the cover band, and a section of the main flow path boundary that is provided directly downstream of the cover band forms a protrusion with respect to the retracted trailing edge, as regarded in the flow direction.

14. A turbine of an aircraft engine, comprising the cover band assembly according to claim 1.

* * * * *